United States Patent
Forghani-zadeh et al.

(10) Patent No.: US 7,940,118 B1
(45) Date of Patent: May 10, 2011

(54) DYING GASP CHARGE CONTROLLER

(75) Inventors: Hassan Pooya Forghani-zadeh, Allen, TX (US); Luis A. Huertas-Sanchez, Allen, TX (US); Li Li, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/616,549

(22) Filed: Nov. 11, 2009

(51) Int. Cl.
*G05F 1/10* (2006.01)

(52) U.S. Cl. ........................................ 327/536

(58) Field of Classification Search .................. 327/535, 327/536, 537
See application file for complete search history.

(56) References Cited

U.S. PATENT DOCUMENTS

| 7,098,557 B2 | 8/2006 | Swanson et al. |
| 7,557,640 B2 * | 7/2009 | Cheung et al. ................. 327/536 |

* cited by examiner

*Primary Examiner* — Jeffrey S Zweizig
(74) *Attorney, Agent, or Firm* — John J. Patti; Wade J. Brady, III; Frederick J. Telecky, Jr.

(57) ABSTRACT

In many applications, "dying gasp" periods following power down are used. Conventional circuits supply energy for the "dying gasp" periods generally by use of large external capacitors that are bulky and expensive. Here, a dying gasp charge controller is employed that allows for the use of smaller capacitors at higher voltages, which maintains or exceeds the energy storage capacities of conventional circuits.

15 Claims, 2 Drawing Sheets ed States Patent

DYING GASP CHARGE CONTROLLER

TECHNICAL FIELD

The invention relates generally to charge controller and, more particularly, to a dying gasp charge controller.

BACKGROUND

In some power management systems, power down should be controlled enough so the system can gracefully shut down. An example of such an application is the digital subscriber line or xDSL modem standards compliant applications, which require manufacturers to allow for a "dying gasp" time when input power is disconnected. Typically, this "dying gasp" is on the order of about 60 ms. During this "dying gasp," xDSL modems can communicate with the central computer about the shutdown and allow for better traffic handling.

Conventional solutions generally employ large external capacitors to store enough energy to operate the xDSL modem for the "dying gasp" period. These capacitors are generally on the order of 2000 μF to 8000 μF. Because these are large external capacitors, they are bulky and expensive, so it is desirable to reduce their size to produce a more economical xDSL modem.

Additionally, an example of conventional circuits is U.S. Pat. No. 7,098,557.

SUMMARY

A preferred embodiment of the present invention, accordingly, provides an apparatus. The apparatus comprising an input node; an internal capacitor that is coupled to the input node; an output node; and a dying gasp charge controller including: a dump circuit that is coupled to the input node and the output node, wherein the dump circuit provides charge to the output node from the input node on startup when the voltage on the output node is less than a precharge voltage, and wherein the dump circuit provides charge to the input node from the output node when the voltage on the input node falls below a gasp voltage; and a pump circuit that is coupled to the input node and the output node, wherein the pump circuit provides charge to the output node from the input node when the voltage on the output node is less than a charge voltage.

In accordance with a preferred embodiment of the present invention, the dump circuit further comprises a first transistor having a first passive electrode, a second passive electrode, and a control electrode, wherein the first passive electrode of the first transistor is coupled to the input node; a current limiter that is coupled to the input node and the control electrode of the first transistor; a second transistor having a first passive electrode, a second passive electrode, and a control electrode, wherein the first passive electrode of the first transistor is coupled to the second passive electrode of the first transistor, and wherein the second passive electrode of the second transistor is coupled to the output node; and an amplifier having a first input terminal, a second input terminal, and an output terminal, wherein the first input terminal of the amplifier is coupled to the input node, and wherein the second input terminal of the amplifier receives the gasp voltage, and wherein the output terminal of the amplifier is coupled to the control electrode of the second transistor.

In accordance with a preferred embodiment of the present invention, the first transistor is a PMOS transistor with the first passive electrode being the source, the second passive electrode being the drain, and the control electrode being the gate.

In accordance with a preferred embodiment of the present invention, the second transistor is a PMOS transistor with the first passive electrode being the drain, the second passive electrode being the source, and the control electrode being the gate.

In accordance with a preferred embodiment of the present invention, the pump circuit further comprises a low drop-out (LDO) regulator that is coupled to the input node; and a charge pump coupled between the LDO regulator and the output node.

In accordance with a preferred embodiment of the present invention, the pump circuit further comprises a charge pump.

In accordance with a preferred embodiment of the present invention, the pump circuit further comprises a boost converter.

In accordance with a preferred embodiment of the present invention, an apparatus is provided. The apparatus comprises an input node; a first capacitor that is coupled to the input node; an output node; a dying gasp charge controller including: a first PMOS transistor that is coupled to the input node at its source; a current limiter that is coupled to the input node and the gate of the first PMOS transistor; a second PMOS transistor that is coupled to the drain of the first PMOS transistor at its drain and the output node at its source; and an amplifier having a first input terminal, a second input terminal, and an output terminal, wherein the first input terminal of the amplifier is coupled to the input node, and wherein the second input terminal of the amplifier receives the gasp voltage, and wherein the output terminal of the amplifier is coupled to the gate of the second PMOS transistor; and a pump circuit that is coupled to the input node and the output node, wherein the dump circuit provides charge to the output node from the input node when the voltage on the output node is less than a charge voltage; and a second capacitor that is coupled to the output node.

In accordance with a preferred embodiment of the present invention, the LDO regulator further comprises: a third PMOS transistor that is coupled to the input node at its source; and a second amplifier having a first input terminal, a second input terminal, and an output terminal, wherein the first input terminal of the second amplifier receives the charge voltage, and wherein the second input terminal of the second amplifier is coupled to the output node, and wherein the output terminal of the second amplifier is coupled to the gate of the third PMOS transistor.

In accordance with a preferred embodiment of the present invention, the charge pump further comprises: a first diode that is coupled to the drain of the third PMOS transistor; a second diode coupled between the first diode and the output node; and a third capacitor that is coupled to a node between the first and second diodes and that is coupled to a switching node.

In accordance with a preferred embodiment of the present invention, the apparatus further comprises a buck converter having the switching node which is coupled to the third capacitor.

In accordance with a preferred embodiment of the present invention, an apparatus is provided. The apparatus comprises an input node; a first capacitor that is coupled to the input node; an output node; a buck converter having: a first NMOS transistor that coupled to the input node at its drain and a switching node at its source; a second NMOS transistor that is coupled to the switching node at its drain and ground at its source; a pulse width modulator (PWM) coupled to the gates of the first and second NMOS transistors; a dying gasp charge controller including: a first PMOS transistor that is coupled to the input node at its source; a current limiter that is coupled to the input node and the gate of the first PMOS transistor; a second PMOS transistor that is coupled to the drain of the first PMOS transistor at its drain and the output node at its source; a first amplifier having a first input terminal, a second input terminal, and an output terminal, wherein the first input terminal of the first amplifier is coupled to the input node, and wherein the second input terminal of the first amplifier receives the gasp voltage, and wherein the output terminal of the first amplifier is coupled to the gate of the second PMOS transistor; a third PMOS transistor that is coupled to the input node at its source and that is coupled to the output node at its source; a second amplifier having a first input terminal, a second input terminal, and an output terminal, wherein the first input terminal of the second amplifier receives the charge voltage, and wherein the second input terminal of the second amplifier is coupled to the output node, and wherein the output terminal of the second amplifier is coupled to the gate of the third PMOS transistor; a first diode that is coupled to the drain of the third PMOS transistor; a second diode coupled between the first diode and the output node; and a second capacitor that is coupled to a node between the first and second diodes and that is coupled to a switching node; and a third capacitor that is coupled to the output node.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
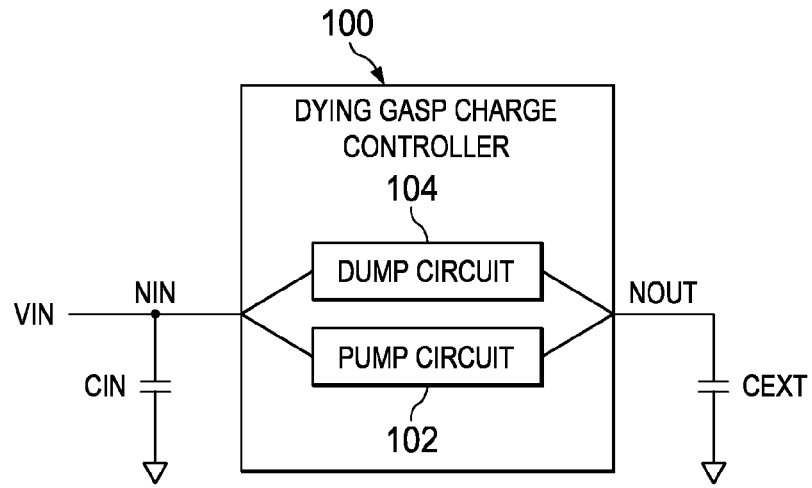
FIG. 1 is a circuit diagram of a dying gasp charge controller in accordance with a preferred embodiment of the present invention.

Refer now to the drawings wherein depicted elements are, for the sake of clarity, not necessarily shown to scale and wherein like or similar elements are designated by the same reference numeral through the several views.

Referring to FIG. 1 of the drawings, reference numeral 100 generally designates an example of a dying gasp charge controller in accordance with a preferred embodiment of the present invention. It is well known that the energy stored on a capacitor is $\frac{1}{2} CV^2$, where C is the capacitance of the capacitor and V is the voltage on the capacitor. Thus, to maintain substantially the same energy on two different size capacitors (having different capacitances), one would vary the voltage. Here, this principle is applied to the controller 100, where an input large capacitor has been divided to an internal capacitor CIN and an external capacitor CEXT (which are coupled to the input node NIN and output node NOUT of the controller 100, respectively) so that the voltage can be varied to have the same energy as a large capacitor. Each of capacitors CIN and CEXT are also about 100 µF and about 1000 µF, respectively.

To accomplish this, controller 100 employs a pump circuit 102 and a dump circuit 104. The pump circuit 102 provides charge to the output node NOUT (and the external capacitor CEXT) from the input node NIN (which receives an input voltage VIN) on startup. In particular, dump circuit 104 charges the external or storage capacitor CEXT in a precharge mode when the voltage on the output node NOUT is less than a precharge voltage (typically about the input voltage VIN minus a voltage drop across a body diode). Following the precharge mode, the pump circuit 102 continues to charge the external capacitor CEXT by allowing charge to flow from the input node NIN to the output node NOUT until the voltage on the output node NOUT (and external capacitor CEXT) is greater than a charge voltage VMAX (which is typically about twice the input voltage VIN and which can be selectable by digital controls to generally ensure that the charge voltage VMAX does not exceed the voltage rating of the external capacitor CEXT). Controller 100 then continues to monitor the input voltage VIN (voltage on the input node NIN), and when the input voltage VIN (which is typical between about 9V and about 12V) falls below a gasp voltage VGASP (which is typically about 90% of the input voltage VIN), the external capacitor CEXT is discharged through the dump circuit 104 to the input node NIN.

There are several different implementation of the controller 100 that can be realized. For example, the pump circuit 102 can be implemented as a charge pump, a boost regulator, or a linear drop-out (LDO) regulator with a charge pump. Each of these different implementations provides a different set of benefits and drawback, but of the three enumerated implementations, the LDO regulator with a charge pump occupies the least amount of area.

Figure 3:
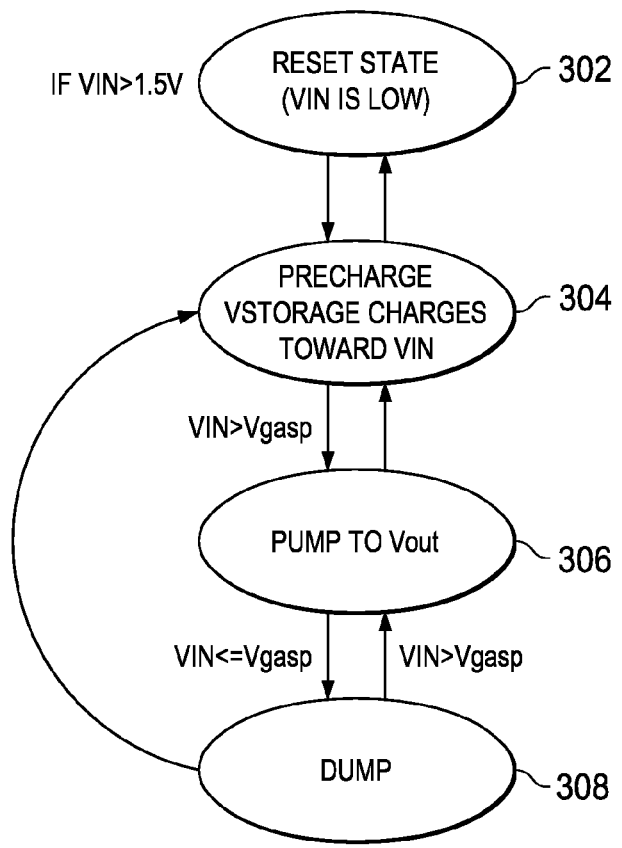
FIG. 3 is a state diagram for the dying gasp charge controller of FIG. 2.
Figure 2:
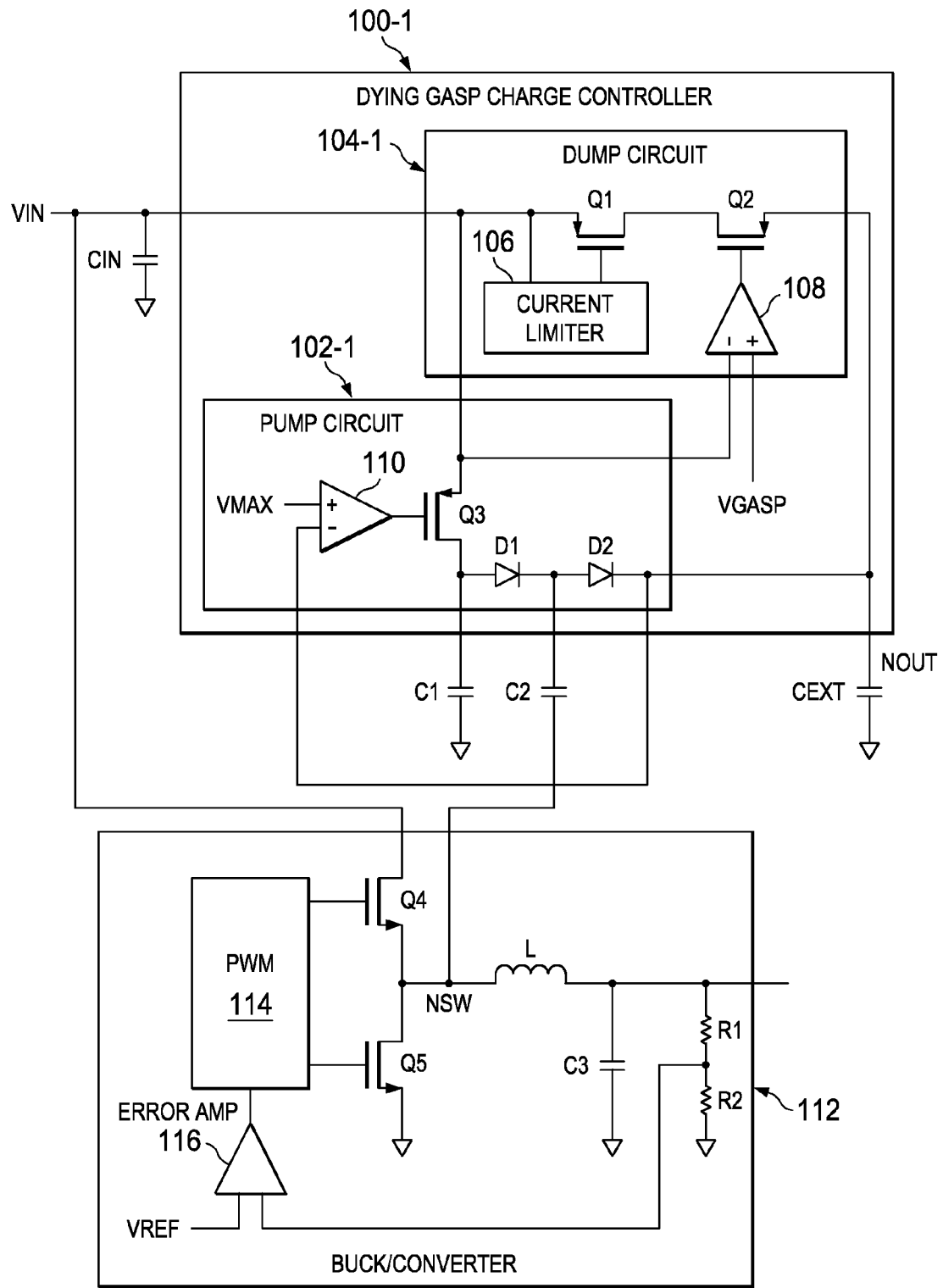
FIG. 2 is a more detailed example of the dying gasp charge controller of FIG. 1.

Turning to FIGS. 2 and 3 of the drawings, an example of controller 100 (indicated by reference numeral 100-1) that employs an LDO regulator with a charge pump is shown along with its state diagram. In this configuration, controller 100-1 is coupled to internal capacitors CIN, C1, and C2, external capacitor CEXT, and buck converter 112. The dump circuit 104-1 (which has the same general operation as dump circuit 104 of FIG. 1) is generally comprised of PMOS transistors Q1 and Q2, current limiter 106, and amplifier 108. The pump circuit 102-1 (which has the same general operation as pump circuit 102 of FIG. 1) is generally comprised of amplifier 110, PMOS (or NMOS) transistor Q3, diodes D1 and D2, and capacitor C2. Additionally, buck converter 112 is generally comprised of a pulse width modulator 114, an error amplifier 116, voltage divider R1 and R2, inductor L, capacitor C3, and NMOS transistors Q4 and Q5. Buck converter 112 operates in the conventional manner by applying PWM signals (which are adjusted through the error amplifier 116 comparing the feedback voltage from voltage divider R1 and R2 to a reference voltage VREF) to the gates of transistors Q4 and Q5. This allows the switching node NSW to switch between ground and input voltage VIN to drive inductor L and capacitor C3. Additionally, buck converter 112 can be replaced by another circuit that provides a switching node similar to that provided buck converter 112.

In operation, controller 100-1 is able to charge and discharge the external capacitor CEXT in generally the same manner as controller 100 of FIG. 1. During startup, the input voltage VIN rises to a desired level (for example, about 12V and typically above about 1.5V) of state 302, and the controller 100-1 enters the precharge mode of state 304. During the precharge mode of state 304, amplifier 108 maintains transistor Q2 in an "off" state so that it operates as a diode (using the inherent body diode of transistor Q2), and current limiter 106 measures the current from the input node NIN to the output node NOUT so as to operate transistor Q1 as a current-limited switch. The dump circuit 104-1, then, continues to charge the external capacitor CEXT until the voltage on the output node (and capacitor CEXT) is greater than the precharge voltage (typically about the input voltage VIN minus a voltage drop across the body diode of transistor Q3). Once the voltage on capacitor CEXT is greater than the precharge voltage, the controller 100-1 enters a charge mode of state 306 where the amplifier 110 actuates transistor Q3 to allow charge to continue to flow from the input node NIN to the output node NOUT until the voltage on the output node NOUT (and capacitor CEXT) is greater than the charge voltage VMAX. Additionally, a stepping voltage (which is lower than the input voltage VIN) is applied to capacitor C2 (which is coupled to a node between diodes D1 and D2) by a switching node (for example, from switching node NSW of buck converter 112) to provide additional charge control, operating as a charge pump.

Once capacitor CEXT is charged, amplifier 108 continues to monitor the input voltage VIN to determine whether it has fallen below the gasp voltage VGASP (indicating power loss). When this power loss is detected, controller 100-1 enters a dump mode of state 308. In the dump mode of state 308, amplifier 108 actuates transistor Q2, and the current limiter 106 does not limit any current flowing from output to input node during dump mode, allowing transistor Q2 to act as a power field effect transistor (FET) of an LDO and allowing transistor Q1 act as a switch. Current can then flow from the output node NOUT (and capacitor CEXT) to the input node NIN. Thus, the system can use the energy stored on capacitors CIN and CEXT to continue to power the system during a "dying gasp" period without the use of a bulky and expensive external capacitor. Additionally, because a large voltage is applied to capacitors CIN and CEXT, the energy storage capacity meets or exceeds that of conventional circuits.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    an input node;
    an internal capacitor that is coupled to the input node;
    an output node; and
    a dying gasp charge controller including:
        a dump circuit that is coupled to the input node and the output node, wherein the dump circuit provides charge to the output node from the input node on startup when the voltage on the output node is less than a precharge voltage, and wherein the dump circuit provides charge to the input node from the output node when the voltage on the input node falls below a gasp voltage; and
        a pump circuit that is coupled to the input node and the output node, wherein the pump circuit provides charge to the output node from the input node when the voltage on the output node is less than a charge voltage.

2. The apparatus of claim 1, wherein the dump circuit further comprises:
    a first transistor having a first passive electrode, a second passive electrode, and a control electrode, wherein the first passive electrode of the first transistor is coupled to the input node;
    a current limiter that is coupled to the input node and the control electrode of the first transistor;
    a second transistor having a first passive electrode, a second passive electrode, and a control electrode, wherein the first passive electrode of the first transistor is coupled to the second passive electrode of the first transistor, and wherein the second passive electrode of the second transistor is coupled to the output node; and
    an amplifier having a first input terminal, a second input terminal, and an output terminal, wherein the first input terminal of the amplifier is coupled to the input node, and wherein the second input terminal of the amplifier receives the gasp voltage, and wherein the output terminal of the amplifier is coupled to the control electrode of the second transistor.

3. The apparatus of claim 2, wherein the first transistor is a PMOS transistor with the first passive electrode being the source, the second passive electrode being the drain, and the control electrode being the gate.

4. The apparatus of claim 3, wherein the second transistor is a PMOS transistor with the first passive electrode being the drain, the second passive electrode being the source, and the control electrode being the gate.

5. The apparatus of claim 1, wherein the pump circuit further comprises:
    a low drop-out (LDO) regulator that is coupled to the input node; and
    a charge pump coupled between the LDO regulator and the output node.

6. The apparatus of claim 1, wherein the pump circuit further comprises a charge pump.

7. The apparatus of claim 1, wherein the pump circuit further comprises a boost converter.

8. An apparatus
    an input node;
    a first capacitor that is coupled to the input node;
    an output node;
    a dying gasp charge controller including:
        a first PMOS transistor that is coupled to the input node at its source;
        a current limiter that is coupled to the input node and the gate of the first PMOS transistor;
        a second PMOS transistor that is coupled to the drain of the first PMOS transistor at its drain and the output node at its source; and
        an amplifier having a first input terminal, a second input terminal, and an output terminal, wherein the first input terminal of the amplifier is coupled to the input node, and wherein the second input terminal of the amplifier receives the gasp voltage, and wherein the output terminal of the amplifier is coupled to the gate of the second PMOS transistor; and a pump circuit that is coupled to the input node and the output node, wherein the pump circuit provides charge to the output node from the input node when the voltage on the output node is less than a charge voltage; and a second capacitor that is coupled to the output node.

9. The apparatus of claim 8, wherein the pump circuit further comprises:
a LDO regulator that is coupled to the input node; and
a charge pump coupled between the LDO regulator and the output node.

10. The apparatus of claim 9, wherein the LDO regulator further comprises:
a third PMOS transistor that is coupled to the input node at its source; and
a second amplifier having a first input terminal, a second input terminal, and an output terminal, wherein the first input terminal of the second amplifier receives the charge voltage, and wherein the second input terminal of the second amplifier is coupled to the output node, and wherein the output terminal of the second amplifier is coupled to the gate of the third PMOS transistor.

11. The apparatus of claim 10, wherein the charge pump further comprises:
a first diode that is coupled to the drain of the third PMOS transistor;
a second diode coupled between the first diode and the output node; and
a third capacitor that is coupled to a node between the first and second diodes and that is coupled to a switching node.

12. The apparatus of claim 11, wherein the apparatus further comprises a buck converter having the switching node which is coupled to the third capacitor.

13. The apparatus of claim 8, wherein the pump circuit further comprises a boost regulator.

14. The apparatus of claim 8, wherein the pump circuit further comprises a charge pump.

15. An apparatus
an input node;
a first capacitor that is coupled to the input node;
an output node;
a buck converter having:
a first NMOS transistor that coupled to the input node at its drain and a switching node at its source;
a second NMOS transistor that is coupled to the switching node at its drain and ground at its source; and
a pulse width modulator (PWM) coupled to the gates of the first and second NMOS transistors;
a dying gasp charge controller including:
a first PMOS transistor that is coupled to the input node at its source;
a current limiter that is coupled to the input node and the gate of the first PMOS transistor;
a second PMOS transistor that is coupled to the drain of the first PMOS transistor at its drain and the output node at its source;
a first amplifier having a first input terminal, a second input terminal, and an output terminal, wherein the first input terminal of the first amplifier is coupled to the input node, and wherein the second input terminal of the first amplifier receives the gasp voltage, and wherein the output terminal of the first amplifier is coupled to the gate of the second PMOS transistor;
a third PMOS transistor that is coupled to the input node at its source;
a second amplifier having a first input terminal, a second input terminal, and an output terminal, wherein the first input terminal of the second amplifier receives a charge voltage, and wherein the second input terminal of the second amplifier is coupled to the output node, and wherein the output terminal of the second amplifier is coupled to the gate of the third PMOS transistor;
a first diode that is coupled to the drain of the third PMOS transistor;
a second diode coupled between the first diode and the output node; and
a second capacitor that is coupled to a node between the first and second diodes and that is coupled to the switching node; and
a third capacitor that is coupled to the output node.

* * * * *